United States Patent Office 3,577,407
Patented May 4, 1971

3,577,407
HIGHLY HYDROXYPROPYLATED GRANULE POTATO STARCH
Erling T. Hjermstad, Cedar Rapids, Iowa, assignor to Penick & Ford, Limited, Cedar Rapids, Iowa
No Drawing. Filed May 19, 1969, Ser. No. 826,027
Int. Cl. C08b *19/06*
U.S. Cl. 260—233.3                     3 Claims

ABSTRACT OF THE DISCLOSURE

A process for the production of hydroxypropylstarch in the water-washable granule form even after reaction to a high degree of substitution (up to 20–30% hydroxypropyl content) by treating potato starch granules at elevated temperatures in water suspesion of near-neutral pH for at least one hour followed by alkaline catalyzed hydroxypropylation.

BACKGROUND OF THE INVENTION

The preparation of alkyl ethers of starch has been disclosed in scientific and patent literature for many years. Starch, which has many available hydroxyl groups, can be alkylated by processes similar to those used to alkylate alcohols. In these reactions the hydrogen of a hydroxyl group is replaced by an alkyl or substituted alkyl radical and an ether group is formed. Thus, starch will react with alkyl halides to form alkyl ethers, and with certain unsaturated compounds by 1–4 addition to form substituted alkyl ethers.

Processes for the preparation of starch ethers having either low or high degrees of alkyl group substitution have been disclosed in the patent literature. Low-substituted starch ethers having a substitution range up to around 0.15 alkyl group per anhydroglucose unit have been prepared by reacting etherifying reagents with ungelatinized starch in alkaline aqueous suspensions. These processes generally result in cold-water-insoluble starch ethers which can be readily purified by dewatering on a filter and washing the filter cake.

In all of these and similar processes the starch ether product is maintained in a water washable state by limiting the degree of ether group substitution to less than 0.15 mole per anhydroglucose unit and the product is purified by washing with water.

As the degree of monofunctional ether group substitution in starch is increased, the product becomes increasingly cold-water-soluble. Higher-substituted starch ethers having degrees of alkyl group substitution above 0.15 mole per anhydroglucose unit as produced by prior processes are very difficult to purify because they tend to swell or gelatinize and form a water-impervious filter cake. The preparation of high-substituted starch ethers has generally been restricted to processes involving a limited proportion of moisture insufficient to swell the starch ether product, or the use of non-swelling liquids, such as alcohols or ketones.

The prior art discloses that unswollen granule starch can be reacted with etherifying agents in the presence of a limited amount of moisture, insufficient to swell the product, or in non-starch-swelling liquids such as alcohols or ketones. By these processes granule starch ethers which swell instantly when placed in cold water are obtained. By these processes, the substitution of from 0.3 to 0.6 mole of ether group per anhydroglucose unit results in cold-water-swelling granules.

Products prepared by these prior art processes show cold-water-swelling properties even at lower degrees of ether group substitution such as 0.2–0.3 mole of hydroxypropyl per anhydroglucose unit. Because of their tendency to swell greatly in cold water, these products cannot be purified by simple washing of their filter cakes with water. Therefore, their purification is somewhat difficult and costly. Side reaction products and salts can be removed only by repeated extractions with solvents such as alcohols or ketones or other water-miscible solvents mixed with a limited amount of water, insufficient to swell the starch granules. Due to the cost of solvents, recovery costs, and costs of special equipment and safe operation of solvent processes, such purified high-substituted starch granule ethers have not heretofore been considered economically feasible for the usual commercial applications.

The higher-substituted hydroxypropyl starches produced by prior art processes contain salts and propylene glycol as contaminants. This propylene glycol contaminant, while not necessarily toxic or harmful, has a bitter taste which is not desirable in food products. It can be removed by extraction of the cold-water-swelling starch ether with water-miscible solvents mixed with water. This is a costly procedure, as indicated above, and the possibility of residual solvent in the food product must be considered. Such solvents tend to be adsorbed by the starch and resist removal on drying. There is, therefore, a need for a process of preparing and purifying medium and high-substituted hydroxypropyl starch ethers without the use of organic solvents. There is also a need for an economical process for preparation and purification of other high-substituted starch ethers, since present processes are not economically feasible.

The process provided by the present invention for preparing higher monofunctionally substituted hydroxypropyl ethers of starch which can be purified by washing with water on a filter or in centrifugal equipment results in much greater economy and greatly improved product purity. Such products are also much more suitable for use in foods.

SUMMARY OF THE INVENTION

The present invention concerns a new hydroxypropylstarch which remains in the granule form even when alkylated to a high degree of substitution, and to processes for making same. According to the present invention potato starch in granule form is given a pretreatment in aqueous suspension at elevated temperature to markedly increase the stability of the granules against swelling or gelatinization. The pretreated starch is then reacted with an hydroxypropylating agent in an alkaline aqueous system to yield a high-substituted hydroxypropylstarch in granule form which can be dewatered and washed with water to a high purity with little or no swelling.

The broad invention is based on the discovery that potato starch which has been given a warm-water stabilizing treatment can be reacted in an aqueous system with propylene oxide to yield high-substituted hydroxypropyl starch which can be dewatered and washed with water to a high purity with little or no swelling. The process of the present invention involves heating a suspension of potato starch at temperatures below its swelling temperature or the swelling temperature attained by the treatment. This treatment raises the swelling temperature of potato starch and also makes it more resistant to swelling by the action of aqueous alkali. Surprisingly, this resistance to swelling by aqueous alkali is retained by warm-water-stabilized potato starch during monofunctional derivatization with alkylating agents and persists even when the starch has reached a relatively high hydroxypropyl content. The high-substituted hydroxypropylated starch remains in the ungelatizined granule form and can be readily dewatered and washed free of salts and side reaction products. The product dries to a white, non-gritty state which disperses readily in water without lumping. When untreated potato starch is hydroxypropylated under identical conditions to the extent obtained by the present process, it swells and becomes unfilterable and unwashable with water, due to forming a water impervious filter cake. Such products, even if purified by extreme methods such as pressure filtration, centrifugation, or dialysis, are very sticky or gelatinous and when dried form a very hard, horny mass which is extremely difficult to grind and which does not readily redissolve in water. Warm-water-stabilized potato starch can be hydroxypropylated to levels as high as around 20% hydroxypropyl content or about 0.7 mole of hydroxypropyl per $C_6H_{10}O_5$ mole of starch and remain readily filterable and water washable without swelling.

DESCRIPTION OF THE PREFERRED EMBODIMENTS

A preferred embodiment of the present invention is hydroxypropylstarch in granule form having a hydroxypropyl content of about 10 to 25% by weight. This novel starch derivative is produced by treating potato starch granules according to the process disclosed in copending application Ser. No. 826,026, entitled, "Improvement of Potato Starch Properties by Controlled Heating in Aqueous Suspension," filed on the same date as the present application, which copending application is incorporated herein by reference.

By that process a neutral aqueous suspension of potato starch at concentartions up to around 40% dry substance is first heated for an interval below the incipient swelling temperature of the particular batch of starch which is used. The temperature is then raised in 5 to 10° F. steps, holding for a period of time (e.g. 1 to 3 hours) at each temperature level until a temperature well above the original swelling temperature is obtained. A similar effect is obtained by prolonged heating at temperatures somewhat below the initial swelling temperature. For maximum effect in attaining high degrees of hydroxypropylation without swelling, it is preferred that the neutral swelling temperature of the potato starch be raised about 20 to 30° F.

The warm-water stabilized potato starch is then hydroxypropylated by adding to the suspension a strong alkali, preferably sodium or potassium hydroxide and an alkali metal sulfate, preferably sodium sulfate, care being taken to avoid local gelatinization or swelling of the starch by the alkali before it is distributed throughout the suspension. The proportion of alkali metal sulfate used will depend upon the degree of hydroxypropylation which is desired and will range from 5% to 25% $Na_2SO_4$ based on total water in the suspensions. For hydroxypropylations below 10% hydroxypropyl content, the use of 5–10% $Na_2SO_4$ is preferred while for hydroxypropylations of 10–30% hydroxypropyl content the use of 10–30% $Na_2SO_4$ based on the total water is preferred. Generally, proportions of sodium hydroxide or molar equivalent amount of other alkali equal to 0.3 to 5% NaOH based on starch solids in the suspension are suitable. The use of 0.5% to 2.0% NaOH on starch solids is preferred.

Propylene oxide is added and the suspension agitated in apparatus provided with means to remove the heat evolved by the exothermic etherification reaction. It may be added gradually, as fast as it is consumed in the reaction or periodically in several increments. For hydroxypropylated starch containing from 5–30% hydroxypropyl, the use of 10–60% of propylene oxide based on starch solids is suitable. The etherification is conducted at temperatures below the swelling temperature of the etherified starch product. In general, temperatures ranging from 70–120° F. are suitable, depending upon the degree of etherification which is sought. The preferred reaction temperature range is 90–110° F.

When the desired proportion of propylene oxide has reacted, the suspension is neutralized with acid and dewatered by filtration or centrifugation to form a cake. The filter cake is then washed with water to remove the salt and side reaction products. The washed product can then be dried readily to form a powdery, non-gritty, normal appearing starch product in the original granule form. Products having hydroxypropyl content as high as 20% are readily filterable and washable. Attempts to hydroxypropylate untreated potato starch resulted in swelling to an unfilterable and unwashable state even when identical hydroxypropylation conditions were used. It has been found that other varieties of starch such as corn starch, tapioca starch, and waxy-maize starch do not respond to warm-water treatment to produce unswollen hydroxypropyl derivatives.

High-substituted starch ethers have a number of improved and new properties not possessed by underivatized native starches. Many of these new properties are very useful in specific applications where starch is used in industrial processes and consumer uses, including foods.

One outstanding property of higher-substituted starch ethers, for example 4% to 10% hydroxyethyl or hydroxypropyl content, is the very greatly increased resistance to freeze-thaw effects as compared with underivatized commercial starches and low-substituted ether derivatives. When normal starch pastes are subjected to slow freezing and thawing or repeated freezing and thawing, their pastes undergo syneresis, become spongy and insoluble, and lose their smooth, cohesive texture. Highly substituted starch ethers form pastes which are practically unchanged on repeated freezing and thawing. An edible starch ether, for example, highly substituted, purified hydroxypropyl starch prepared by the present process, is therefore ideally suited for use as thickeners and stabilizers in frozen foods such as frozen soup, gravies, fillings, etc. The resistance of highly substituted starch ethers to paste deterioration on freezing and thawing is of value in other applications where freezing or near freezing temperatures may be encountered, for example, poster pastes, adhesives, and liquid laundry starches.

Another outstanding property of highly-substituted starch ethers as compared with underivatized or low-substituted starches is their paste stability or resistance to "set-back" on aging. Underivatized or low-substituted starch ethers form pastes which tend to become retrograded or associated on aging, especially when held in high concentrations. Thus, when formulated in such applications as adhesives, pastes, sizes, etc., they cause the formulation to become viscous and even solid on aging. Highly-substituted starch ethers are ideally suited for applications which require resistance to this "set-back." This property of resistance to set-back is retained when highly-substituted starch ethers are converted to thin-boiling starches, oxidatively depolymerized starches, and even dextrins. Formulations containing these conversion products are greatly superior to those containing ordinary dextrins or converted starches.

Another property of high-substituted starch ethers is their resistance to bacterial decomposition of their pastes. Highly-substituted starch hydroxyethyl ethers have been used commercially as textile warp sizes to minimize pollution when the desized starch is discarded into rivers. Such starch has a much lower five-day biochemical oxygen demand (B.O.D.) than underivatized starch and helps prevent oxygen depletion and resultant danger to fish and beneficial organisms in rivers and lakes.

Highly-substituted starch ethers and their films tend to burn readily due to their higher hydrocarbon ratio and burn with a fairly smokeless, non-sooty flame. This property is useful in applications where starch size is removed by burning, for example, in the flame desizing of starch-sized fiber-glass. Low-ash, highly-substituted starch ethers produced by the present process are especially suitable.

EXAMPLE 1

Effects of warm-water treatment on hydroxypropylation of various starches

Potato, corn, tapioca and waxy maize starches were suspended in water in 35% dry substance concentrations at pH 6.5 and the suspensions agitated at 132° F. for 20 hours. The suspensions were then reacted with propylene oxide at 100° F. using 1.5% NaOH on dry starch, 20% $Na_2SO_4$ on total water, and a starch to water ratio of 30:70. The results are given in Table I. The data indicate that corn, tapioca and waxy maize starch are not benefited by prior heating of their suspensions at 132° F., while potato starch treated this way was substituted to a high level without swelling. Tests 5 and 6 showed that much higher degrees of hydroxypropyl substitution can be obtained on corn starch which has not been treated by heating in aqueous suspension.

TABLE I.—EFFECT OF WARM-WATER-TREATMENT ON HYDROXYPROPYLATION OF VARIOUS STARCHES (Reactions with propylene oxide (P.O.) at 100° F., 1.5% NaOH on starch, 20% $Na_2SO_4$ on water; starch to water ratio 30:70)

| | | Heat—H₂O treatment | | | | Total P.O. used (on starch), percent | No. of P.O. additions | Suspension character | Washability | Purification | Filter cake | Ash percent | H.P.[1] content, percent |
|---|---|---|---|---|---|---|---|---|---|---|---|---|---|
| Test | Starch | Concentration, percent | pH | Temp., °F. | Time, hrs. | | | | | | | | |
| 1 | Potato | 35 | 6.6 | 132 | 24 | 30 | 2 | Fluid | Fast | Dil. and washed 3 times. | Normal | .12 | 17.6 |
| 2 | Corn | 35 | 6.5 | 132 | 24 | 10 | 1 | Thick | Nil | Swollen, discarded | | | |
| 3 | Tapioca | 35 | 6.5 | 132 | 24 | 10 | 1 | ...do | Nil | do | | | |
| 4 | Waxy Maize | 35 | 6.5 | 132 | 24 | 10 | 1 | ...do | Nil | do | | | |
| 5 | Corn | | | None | | 16 | 1 | Fluid | Fair | Dil. and washed 3 times. | Normal | .01 | 7.33 |
| 6 | do | | | None | | 20 | 1 | Thick | Slow | Dil. and washed 2 times. | Soft | .54 | 9.35 |
| 7 | Potato | 35 | | None | | 30 | 2 | ...do | Nil | Swollen, discarded | | | |

[1] Hydroxypropyl.

EXAMPLE 2

Hydroxypropylation of warm-water-treated potato starch

Potato starch was suspended in water in a 34–35% d.s. concentration and the pH adjusted to various levels. The suspensions were agitated for 18–24 hours at different temperatures below the swelling temperature of potato starch. The suspensions were then reacted at 100° F. with propylene oxide in suspensions having a starch to water ratio of 30:70 and containing 1.5% NaOH based on dry starch and 20% $Na_2SO_4$ based on total water.

Thirty to forty percent of propylene oxide based on dry starch was added in 2 to 4 increments.

As the reactions progressed the suspensions acquired a very unusual appearance and texture. It appeared that the starch was coalescing to form a less hydrated system, yet did not precipitate out. The texture was similar to that of a dilute paper pulp system—stirrable and pumpable but not a continuous dispersion. Some of these suspensions turned quite brown while others remained white. The suspensions which survived the hydroxypropylation reaction without becoming unfilterable were neutralized and purified as much as possible by dilution to 15° Be, dewatering on a suction filter, and washing the filter cake. Some of the starches could not be washed without serious swelling so they were diluted and dewatered without washing. The dewatered starches were dried at room temperature and analyzed for ash content and moisture.

The heat-water treatment conditions, proportions of reagents, reaction conditions and product data are given in Table II. These data show that a hot-water treatment at a temperature of 132–135° F. results in the highest levels of hydroxypropyl group substitution while remaining washable at a low ash content. A pH around neutrality (pH of 5.5 to 8) gave best results.

All of the starches become very white and colorless on neutralization, dilution, and washing. The brown coloring matter was completely soluble in water and was not absorbed by the starch.

TABLE II.—HYDROXYPROPYLATION OF WARM-WATER-TREATED POTATO STARCH (Reactions with P.O. at 100° F., 15% NaOH on starch, 20% $Na_2SO_4$ on water, starch to water ratio 30:70)

| | Heat—H₂O Treatment | | | P.O. Reaction | | | | | | Percent | |
|---|---|---|---|---|---|---|---|---|---|---|---|
| Test | Percent suspension concentration | Suspension pH | Temp., °F. | Time, hrs. | Total P.O. used (on starch), percent | No. of P.O. additions | Suspension character | Washability | Purification | Filter cake | Ash | H.P. content |
| 8 | 35 | 4.5 | 132 | 24 | 30 | 3 | Unstirrable | V. slow | Dil. and washed 3 times | Soft | 1.06 | 15.4 |
| 9 | 35 | 5.5 | 132 | 24 | 30 | 3 | Thick, brown | Fast | do | Fair | 0.18 | 16.8 |
| 10 | 35 | 6.5 | 132 | 24 | 30 | 3 | Thick, white | do | do | Normal | 0.19 | 17.1 |
| 11 | 35 | 7.5 | 132 | 24 | 30 | 3 | Thick, brown | do | do | do | 0.19 | 14.1 |
| 12 | 35 | 6.5 | 132 | 24 | 30 | 2 | do | do | do | do | | 16.6 |
| 13 | 35 | 7.5 | 132 | 24 | 30 | 2 | Unstirrable | Slow | Dil. 3 times, no wash | Soft | | 17.1 |
| 14 | 35 | 8.5 | 132 | 24 | 30 | 2 | do | Nil | Discarded | | | |
| 15 | 35 | 6.5 | 130 | 24 | 30 | 3 | Thick | Fast | Dil. and washed 3 times | Normal | 0.11 | 16.8 |
| 16 | 35 | 6.5 | 135 | 24 | 40 | 4 | Sl. thick | do | do | do | 0.18 | 20.0 |

What is claimed is:

1. The process of preparing hydroxypropylstarch in water-washable granule form, which process comprises the steps of forming a water suspension of potato starch granules, maintaining said suspension at a temperature above about 100° F. and below the swelling temperature of said granules for a time of at least about one hour sufficient to raise the swelling temperature of said granules about 15° F. above the original swelling temperature of said granules to produce a stabilized starch granule suspension, maintaining said stabilized starch granule suspension at a temperature in the range of about 70 to about 120° F. and distributing throughout said stabilized starch granule suspension an alkaline catalyst and propylene oxide, and reacting said propylene oxide with said stabilized starch granules.

2. The process of claim 1 wherein said water suspension of potato starch granules is adjusted to a temperature of at least about 100° F. and then the temperature of said suspension is raised in steps of 5 to 10° F. to a final temperature in the range of about 132 to 135° F., maintaining the temperature at each step for about 1 to 3 hours.

3. Hydroxypropyl potato starch in water-washable granule form having substantially no tendency to swell in cold water and containing more than 10 percent by weight of hydroxypropyl substituent produced according to the process of claim 1.

References Cited

UNITED STATES PATENTS 3,033,853  5/1962  Klug _____ 260—233.3
3,049,538  8/1962  Brobst _____ 260—233.3
3,378,546  4/1968  Tsuzuki _____ 260—233.3

MORRIS O. WOLK, Primary Examiner

S. MARANTZ, Assistant Examiner

U.S. Cl. X.R.

127—32, 70